United States Patent
Takigahira et al.

(10) Patent No.: US 6,685,192 B2
(45) Date of Patent: Feb. 3, 2004

(54) TANDEM SEAL

(75) Inventors: Yoshiaki Takigahira, Sakado (JP); Hidekazu Takahashi, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 64 days.

(21) Appl. No.: 09/987,430

(22) Filed: Nov. 14, 2001

(65) Prior Publication Data

US 2002/0060430 A1 May 23, 2002

(30) Foreign Application Priority Data

Nov. 14, 2000 (JP) ........................................ 2000-346146

(51) Int. Cl.[7] .............................................. F16V 15/16
(52) U.S. Cl. ........................ 277/408; 277/358; 277/361; 277/399
(58) Field of Search ................................ 277/371, 370, 277/408, 358, 359, 360, 361, 369, 431

(56) References Cited

U.S. PATENT DOCUMENTS

| | | | | |
|---|---|---|---|---|
| 3,813,103 A | * | 5/1974 | Wiese | 277/401 |
| 4,109,920 A | * | 8/1978 | Wiese | 277/408 |
| 4,361,334 A | * | 11/1982 | Amorese et al. | 277/405 |
| 4,741,303 A | * | 5/1988 | Kronich | 123/192.2 |
| 4,744,721 A | * | 5/1988 | Villeneuve | 415/113 |
| 5,076,589 A | * | 12/1991 | Marsi | 277/394 |
| 5,238,253 A | * | 8/1993 | Sieghartner | 277/408 |
| 5,421,593 A | * | 6/1995 | Aritsubo et al. | 277/361 |
| 5,454,572 A | * | 10/1995 | Pospisil | 277/368 |
| 5,468,002 A | * | 11/1995 | Wasser | 277/361 |
| 5,529,315 A | * | 6/1996 | Borrino et al. | 277/352 |
| 5,865,441 A | * | 2/1999 | Orlowski | 277/364 |
| 2002/0115521 A1 | * | 8/2002 | Thoma | 475/221 |

* cited by examiner

Primary Examiner—Anthony Knight
Assistant Examiner—Christopher J. Boswell
(74) Attorney, Agent, or Firm—Jacobson Holman PLLC

(57) ABSTRACT

A pair of primary and secondary mechanical seals are arranged tandem in an axial direction around a rotating shaft in a space between the rotating shaft and a housing having a shaft sealing part. The center or intermediate liquid is sealed into a center room or intermediate chamber between both mechanical seals. The center liquid has an amount that is less than the volume of the center room and enough to soak one part of rotating elements of the secondary mechanical seal. The gas vent line is provided with the housing of the shaft sealing part. The gas vent line faces and opens to the center room. The baffle plate is provided with the housing of the shaft sealing part. The baffle plate intersects a circumferential direction of the center room. Thus, when rotating the rotating shaft, the center liquid is stirred and scattered by collision with the baffle plate to lubricate the sealed slide surface. The vaporized gas from the sealed liquid, which is leaked from the primary mechanical seal to the center room, does not collect in the inner circumferential part of the center room. It does not form a gas zone. It is discharged from the gas vent line.

1 Claim, 3 Drawing Sheets

TANDEM SEAL

FIELD OF THE INVENTION

This invention relates to a tandem seal for sealing a shaft by means of two mechanical seals arranged in a tandem manner in an axial direction, which is used to seal a vaporizable liquid, particularly a liquefied gas, as an object to be sealed.

PRIOR ART

A tandem seal is a shaft sealing device in which two mechanical seals are arranged in a tandem manner in an axial direction. The tandem seal is preferably used with a liquefied gas, for instance, as a sealed object. In the tandem seal, even if large leakage occurs from a mechanical seal at a side of a primary mechanical seal, namely a side of the sealed liquid, a secondary mechanical seal, namely a side of an atmosphere, will be backup. When providing a collection mechanism in a center room between both mechanical seals for collecting the sealed liquid leaked from the primary mechanical seal to the center room, leakage to the side of the atmosphere can be securely prevented.

In the tandem seal, a sealed slide surface of the secondary mechanical seal, which comprises sealing elements at a rotational side and sealing elements at a stationary side, needs to be protected by liquid lubrication. Thereby a center liquid for lubrication is interposed in the center room that is arranged between both mechanical seals. Further, in order to eliminate slide heat generated at a sealed slide surface of the secondary mechanical seal, generally the center liquid is circulated via the outer cooler in a system.

FIG. 3 is a typical prior art showing a tandem seal used as a means for sealing the rotating shaft of the pump for a liquefied gas. Reference numeral 100 designates a rotating shaft of a pump. Numeral 110 designates a housing of a shaft sealing part so assembled that it surrounds an outer circumference of the rotating shaft 100 by a plurality of housing members 111~113 at a shaft sealing position. A shaft center of the rotating shaft 100 and the housing 110 extend almost horizontally. The left side in the figure means the inside of a machine. In the machine, a sealed liquid SL (a liquefied gas) exists in a pump room. The right side in the figure means the outside of the machine, namely, the side of the atmosphere.

In a space around the shaft between the housing 110 of the shaft sealing part and the rotating shaft 100, mechanical seals 120, 130 are provided in the axial direction. The seal 120 is a primary mechanical seal, which is provided to the inside of the machine. The seal 130 is a secondary mechanical seal, which is provided to the outside of the machine.

The primary mechanical seal 120 comprises a non-rotating fixed ring 121 and a rotating ring 123. The fixed ring 121 is supported via an O-ring 122 on the inner circumferential part of the housing member 112 of the housing 110. The rotating ring 123 rotates together with the rotating shaft 100. The rotating ring 123 is provided in a state that it is movable in the axial direction and is sealed with a sleeve 101 of the rotating shaft 100 via a retainer 124 and an O-ring 125. Further, the rotating ring 123 is closely contacted with the fixed ring 121 by an enforcement of springs 126 in the axial direction, which functions seal ability of the shaft on a sealed slide surface 120S.

Basically, the secondary mechanical seal 130 has the similar structure of the primary mechanical seal 120. That is, at the inner circumferential part of the housing member 113 of the shaft sealing part 110, it comprises a non-rotating fixed ring 131 and a rotating ring 133. The fixed ring 131 is supported via an O-ring 132. The rotating ring 133 rotates together with the rotating shaft 100. The rotating ring 133 is provided in a state that it is sealed and is movable in the axial direction via a pumping ring 134 and an O-ring 135 on the sleeve 101 of the rotating shaft 100. Further, the rotating ring 133 is closely contacted with the fixed ring 131 by enforcement in the axial direction of springs 136. This functions seal ability of the shaft on a sealed slide surface 130S.

The primary mechanical seal 120 is provided for the liquefied gas as the sealed object in the pump room in the machine. One part of the sealed liquid SL is sent to an outer circumferential room space A of the primary mechanical seal 120. Then it flows back to the pump room via a flushing discharge hole $F_{OUT}$. Here the flushing discharge hole $F_{OUT}$ opens at the housing member 112 of the shaft sealing part housing 110. This functions as flushing. Thereby the sealed slide surface 120S of the primary mechanical seal 120 is lubricated and cooled.

Further, a center liquid CL lies in a center room B from the inner circumferential space of the sealed slide surface 120S of the primary mechanical seal 120 to the outer circumferential room of the sealed slide surface 130S of the secondary mechanical seal 130. The center liquid CL is flown back through a reservoir tank (not shown in the figure) installed outside, by axial flow pump action of the helical groove 134a of the pumping ring 134, via a circulation injection hole $CL_{IN}$ and a circulation discharge hole $CL_{OUT}$. The pumping ring 134 is provided on the secondary mechanical seal 130. The circulation injection hole $CL_{IN}$ is opened at the housing member 112 of the shaft sealing part housing 110. The circulation discharge hole $CL_{OUT}$ is opened at the housing member 113. This circulation lubricates and cools the sealed slide surface 130S of the secondary mechanical seal 130. Therefore, the center liquid CL is usually filled in the flow line containing the center room B, the reservoir tank, the circulation injection hole $CL_{IN}$, and the circulation discharge hole $CL_{OUT}$.

In the tandem seal described above according to the prior art, the pumping ring 134 circulating the center liquid CL is arranged in the narrow center room B of the inner circumference of the shaft sealing part housing 110. Thus, there is a difficulty to raise pumping efficiency due to the size or limitation of the installing space of the sealing elements.

Further, the sealed liquid SL of the liquefied gas in the machine is pressed to a certain pressure, while the pressure of the center liquid CL in the center room B is low. Then, the sealed liquid SL leaked from the primary mechanical seal 120 to the center room B vaporizes in the center room B. When the bubble thereof in the center liquid CL increases, pumping efficiency by the pumping ring 134 decreases extremely. Moreover, near the rotating pumping ring 134, by the cavitation phenomena generated in the center liquid CL, the pumping ring 134 vibrates, and then this vibration is transmitted to the rotating ring 133 of the secondary mechanical seal 130. Thus, it has bad influence for sealing ability of the secondary mechanical seal 130.

Moreover, the bubble mixed in the center liquid CL by vaporization of the sealed liquid SL leaked from the primary mechanical seal 120 to the center room B sometimes forms gas zone as a result of gathering at the inner circumferential side of the center room B. This is because the center liquid CL in the center room B circulates and flows in the same direction as the rotation of the rotating shaft 100. This is caused by contact with the sealing elements at the rotational side of the secondary mechanical seal 130. Thus, effect of centrifugal separation by specific gravity occurs in the center liquid CL and the bubble of the leaked gas. Accordingly, the sealed slide surface 130S of the secondary mechanical seal 130 becomes a dry-slide state, namely a slide state without liquid lubrication by the gas zone. This will cause unusual wear or damage by overheats and will rapidly lower sealing function.

SUMMARY OF THE INVENTION

The object of the invention is to eliminate bad affects or influence for sealing function caused from a vaporized gas of the sealed liquid that is leaked from a primary mechanical seal into an intermediate chamber or center room formed between the primary mechanical seal and a secondary mechanical seal.

In a tandem seal according to the present invention, a primary mechanical seal and a secondary mechanical seal are arranged tandem in an axial direction around a rotating shaft in a space between the rotating shaft and a housing which constitutes a shaft sealing part, wherein the secondary mechanical seal is arranged outside of the primary mechanical seal in a machine, and wherein the housing of the shaft sealing part surrounds an outer circumference of the rotating shaft, wherein an intermediate or center liquid is sealed into a center room or intermediate chamber between both mechanical seals, wherein the center or intermediate liquid has an amount less than its capacity and enough to be stirred or agitated by a rotating part of the secondary mechanical seal, and wherein a gas vent line is provided in the housing of the shaft sealing part, wherein the gas vent line faces and opens to the center room. According to this invention, the center liquid unfilled in the capacity of the center room is stirred and scattered by a rotational side element of the secondary mechanical seal so as to lubricate the sealed slide surface. In comparison with the center liquid completely filled in the center room, heat generation due to the friction loss between the center liquid and the rotational side element of the secondary mechanical seal (that is heat generation by agitating) decreases. Therefore, the prior circulating and cooling mechanism for circulating and cooling of the center liquid is removed. The gas vaporized from the sealed liquid leaked from the primary mechanical seal in to the center room is naturally discharged from the gas vent line.

Further, in a tandem seal according to the invention, a baffle plate is provided with the housing of the shaft sealing part, wherein the baffle plate intersects a circumferential direction of the center room. Therefore, the center liquid, which is sealed in the center room by the amount unfilled in the capacity, collides with the baffle plate when it revolves and flows in the same direction as the rotation of the rotating shaft by contact with the elements at the rotating side. This leads to effective stirring and successful scattering, and prevents formation of gas zone in the center room.

Further, in a tandem seal according to the invention, a dividing plate, that is located between both mechanical seals, is provided in the housing of the shaft sealing part, wherein the dividing plate has an inner circumferential edge that opposes to the rotating shaft with a small space and divides roughly in the axial direction with the center room. According to the constitution, when generating large amount of leakage from the primary mechanical seal to the center room, it can prevent that the gas vaporized rapidly goes to the side of the secondary mechanical seal.

Further, in a tandem seal according to the invention, a coolant jacket is provided in the housing of the shaft sealing part, wherein a coolant from outside is flowed in the coolant jacket. The center liquid sealed in the center room may be cooled by the heat of vaporization (latent heat) of the leaked liquid on vaporizing from the primary mechanical seal. According to the constitution, cooling effect of the sealed slide surface of the second mechanical seal is raised, since the center liquid is certainly cooled by heat exchange of the coolant in the coolant jacket.

DESCRIPTION OF THE PREFERRED EMBODIMENT

Figure 1:
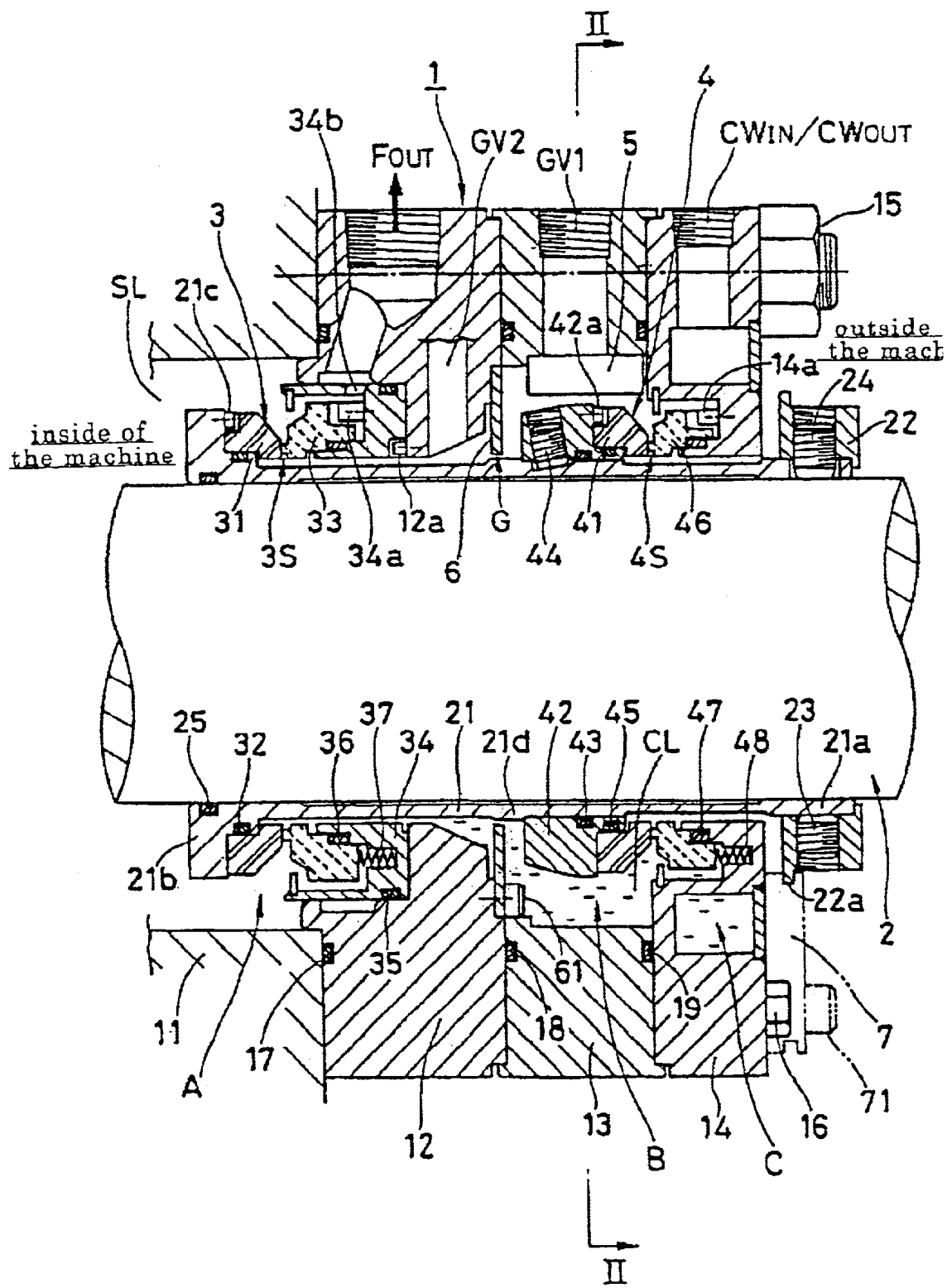
FIG. 1 is a sectional view showing a tandem seal according to a preferred embodiment of the invention shown by cutting with a plane passing through a shaft center.
Figure 2:
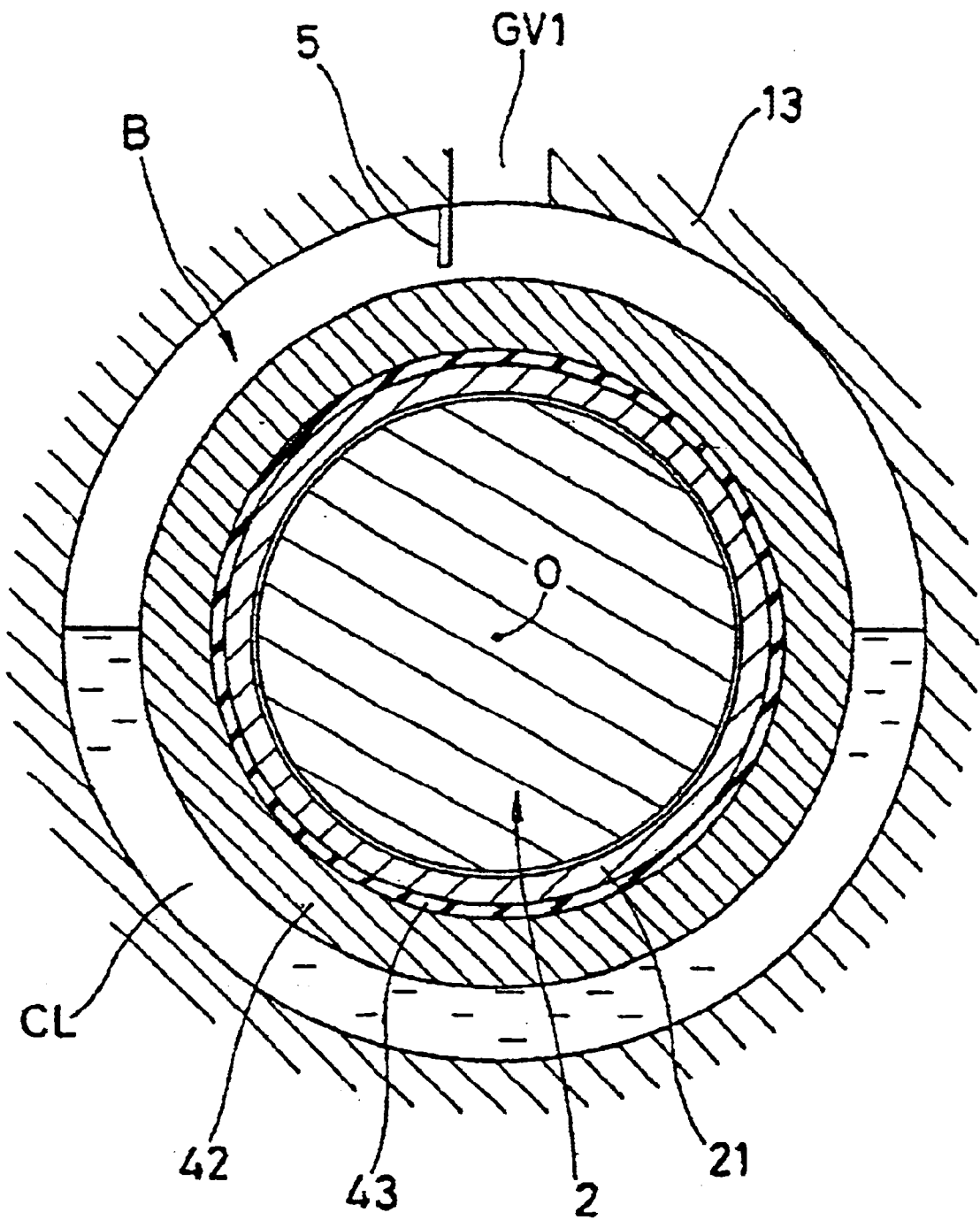
FIG. 2 is a sectional view shown by cutting in the orthogonal direction to the shaft center along the II—II line of FIG. 1.
Figure 3:
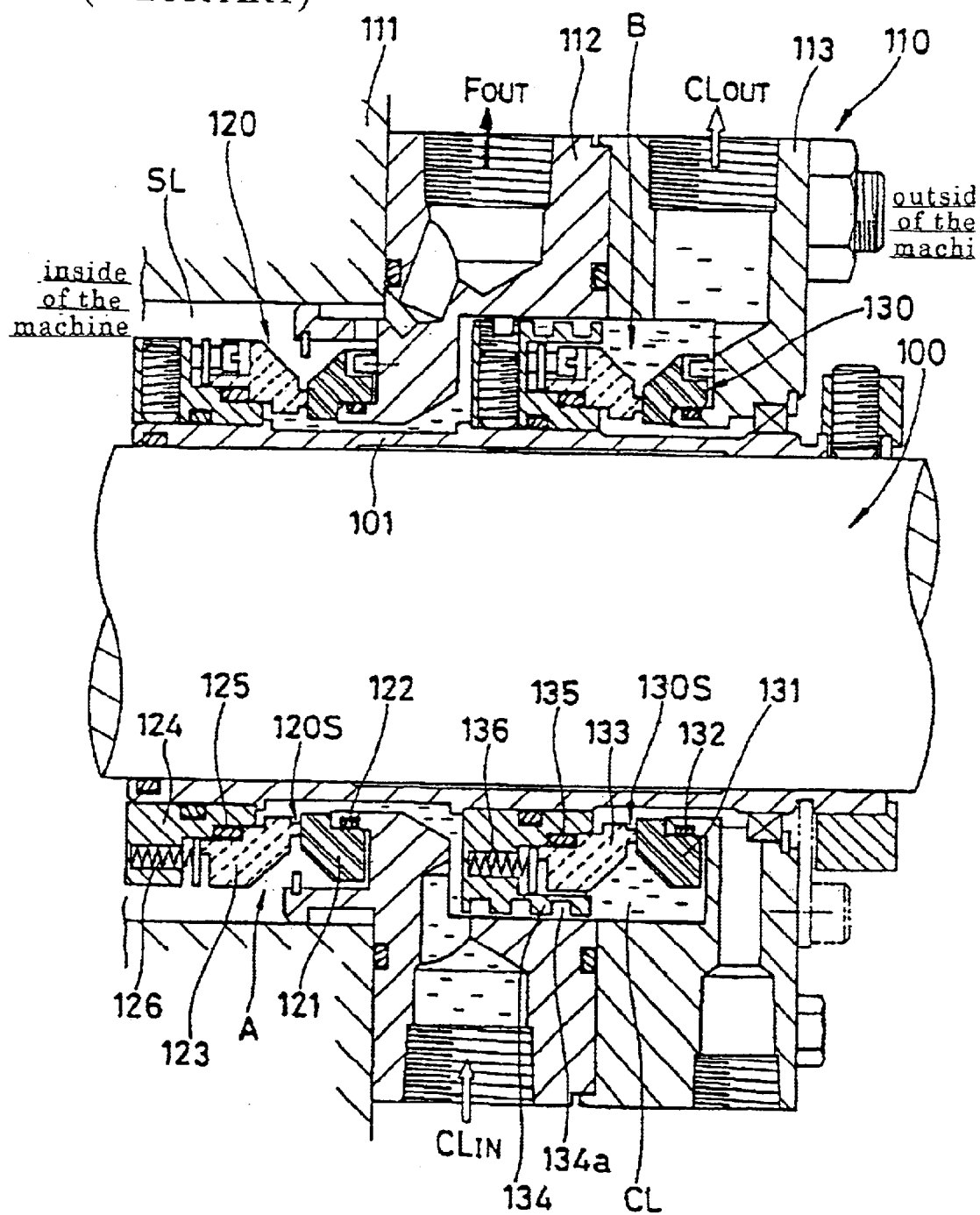
FIG. 3 is a sectional view showing a prior art tandem seal shown by cutting with a plane passing through a shaft center.

FIG. 1 is a sectional view showing a tandem seal according to a preferred embodiment of the invention shown by cutting with a plane passing through a shaft center. FIG. 2 is a sectional view shown by cutting in the orthogonal direction to the shaft center taken along the II—II line of FIG. 1. Reference numeral 1 in FIG. 1 designates a housing in a shaft sealing part of a pump for liquefied gas. Numeral 2 designates a rotating shaft rotating a pump mechanism in a machine. The rotating shaft 2 has a horizontal shaft center. The housing 1 is provided to surround an outer circumference of a shaft sealing device of the rotating shaft 2. Further, the left side in FIG. 1 means the inside of the machine. A sealed liquid SL is filled in a pump room therein. The right side in FIG. 1 means an atmosphere side, namely the outside of the machine.

The housing 1 comprises a shaft hole part 11 of the pump and seal covers 12~14. The seal covers 12~14 are arranged outside of the machine and connected each other in an axial direction by screw members 15, 16. O-rings 17~19 seal between the shaft hole part 11 of the pump and the seal covers 12~14, respectively.

A shaft sleeve 21 is located at the inner circumferential side of the seal covers 12~14 of the housing 1 and externally fitted to the rotating shaft 2. The shaft sleeve 21 is integrally fixed to the rotating shaft 2 by a sleeve collar 22, setscrews 23, and setscrews 24. The sleeve collar 22 is arranged at the outer circumference of the end part 21a of the outside of the machine. The setscrews 23 fix the sleeve collar 22 with the end part 21a. The setscrews 24 fix the sleeve collar 22 to the rotating shaft 2 by penetrating through fixing holes opened at the end part 21a. Further, an O-ring 25 seals between the shaft sleeve 21 and the outer circumferential surface of the rotating shaft 2.

Mechanical seals 3, 4 are arranged tandem in the axial direction on the space between the housing 1 and the shaft sleeve 21 of the rotating shaft 2. The mechanical seals 3, 4 are main constituents of the tandem seal. The primary mechanical seal 3 is located to the inside of the machine (sealed liquid SL side). The secondary mechanical seal 4 is located to the outside of the machine (atmosphere side).

The primary mechanical seal 3 comprises a rotating ring 31 and a non-rotating fixed ring 33. The rotating ring 31 is fixed to the outer circumference of the end part of the shaft sleeve 21 to the inside of the machine. The rotating ring 31 rotates together with the rotating shaft 2. The non-rotating ring 33 is arranged on the inner circumference of the seal cover 12 of the housing 1 nearest inside of the machine. The rotating ring 31 and the fixed ring 33 closely contact each other with opposite faces by enforcement in the axial direction of springs 37. It forms a sealed slide surface 3S.

In detail, a rear surface of the rotating ring 31 is supported by the flange part 21b. The flange part 21b is formed on the end part of the shaft sleeve 21 to the inside of the machine. The rotating ring 31 is attached to the shaft sleeve 21 via an O-ring 32. Further, it engages with the shaft sleeve 21 in the circumferential direction by a knock pin 21c and rotates integrally with the rotating shaft 2. In addition, to an inner circumferential recessed part of the seal cover 12, a ringed case 34 is sealed and fitted via an O-ring 35 and stopped from rotation by the knock pin 12a. The fixed ring 33 is supported by the ringed case 34 via an O-ring 36. The fixed ring 33, which is movable in the axial direction, is stopped from rotation by a knock pin 34a, and forced to the side of the rotating ring 31 by springs 37. The springs 37 are arranged plurality in the circumferential direction.

One part of the sealed liquid SL is sent to the outer circumferential space A of the primary mechanical seal 3. The sealed liquid SL is in the pump room of the machine. From there, it flows back through a hole 34b and a flushing discharge hole $F_{OUT}$. The hole 34b opens at the outer circumferential part of the ringed case 34. The flushing discharge hole $F_{OUT}$ opens at the housing member 12 of the housing 1 to the pump room. Above constitutes flushing. That is, one part of the sealed liquid SL flows via the outer circumferences of the rotating ring 31 and the fixed ring 33 of the primary mechanical seal 3, so that it lubricates the sealed slide surface 3S and eliminates heat of slide effectively.

The secondary mechanical seal 4 comprises a rotating ring 41 and a non-rotating fixed ring 46. The rotating ring 41 is positioned at the inner circumference of the center seal cover 13 of the housing 1, and fixed on the shaft sleeve 21. The rotating ring 41 rotates together with the rotating shaft 2. The non-rotating fixed ring 46 is arranged at the inner circumference of the seal cover 14 of the housing 1 in the outermost side of the machine. The rotating ring 41 and the fixed ring 46 closely contact with opposite end faces by enforcement in the axial direction of springs 48 to form a sealed slide surface 4S.

In detail, the rotating ring 41 is supported by a collar 42 via an O-ring 45. The collar 42 is externally fitted at the center position of the shaft sleeve 21 in the axial direction via an O-ring 43 and fixed by setscrews 44. Further the rotating ring 41 is engaged by a knock pin 42a in the circumferential direction, and rotated integrally with the rotating shaft 2. In addition, the fixed ring 46 is fitted to an inner circumferential recessed part of the seal cover 14 via an O-ring 47. The fixed ring 46, which is movable in the axial direction, is stopped from rotation by the knock pin 14a, and forced to the side of the rotating ring 41 by the springs 48. The springs 48 are arranged plurally in the circumferential direction with the seal cover 14.

In the space between the housing 1 and the shaft sleeve 21, a center room or intermediate chamber B is formed by dividing the primary mechanical seal 3 and the secondary mechanical seal 4. The center room or intermediate chamber B extends from the inner circumferential space of the sealed slide surface 3S of the primary mechanical seal 3 to the outer circumferential space of the sealed slide surface 4S of the secondary mechanical seal 4. In the center room B, a center or intermediate liquid CL is sealed. The center or intermediate liquid CL is unfilled with the capacity, whereas is an adequate amount to lubricate the sealed slide surface 4S of the secondary mechanical seal 4. Preferably as shown in FIG. 2, the liquid surface level thereof in the stationary state is set substantially to the level of the shaft center 0 of the rotating shaft 2 (of the housing 1 of the shaft sealing part). For example, refrigerating machine oil can be adopted as the center or intermediate liquid CL.

That is, the primary mechanical seal 3 is provided for the liquefied gas in the pump room of the machine as a sealed object, whereas the secondary mechanical seal 4 is provided for the center liquid CL mainly sealed in the center room B as the sealed object.

On the seal cover 13 of the housing 1, a first gas vent line GV1 is provided. The first gas vent line GV1 opens at the upper end position of the center room B in the circumferential direction. The first gas vent line GV1 is connected to a collect part for the leaked gas not shown in the figure. Further, on the inner circumferential surface of the seal cover 13, at least one baffle plate 5 is provided to form a plane orthogonal in the circumferential direction of the center room B.

In the center room B, a ringed dividing plate 6 is arranged between the primary mechanical seal 3 and the secondary mechanical seal 4. The dividing plate 6 is fixed to the seal cover 12 of the housing 1 via a volt 61. The inner circumferential edge of the dividing plate 6 faces the outer circumferential surface of the shaft sleeve 21 on the rotating shaft 2 with a small gap G in the radial direction. Further, at the seal cover 12 of the housing 1, a second gas vent line GV2 is provided. The second gas vent line GV2 opens near the primary mechanical seal 3 compared to the dividing plate 6 in the center room B. The gas vent line GV2 is connected to the collect part for the leaked gas not shown in the figure.

On the inner circumferential part of the seal cover 14 of the housing 1, a jacket C for a cooling water is formed continuously in the circumferential direction. The cooling water from outside can pass the jacket C through holes $CW_{IN}/CW_{OUT}$ for passing it.

In the constitution above, if the sealed liquid SL leaks from the primary mechanical seal 3 to the center room B, the sealed liquid SL vaporizes due to the low pressure of the center room B compared to the pump room in the machine. The gas generated by the vaporization (leaked gas hereinafter) does not form a gas zone as in the past by collecting it inside of the inner circumference of the center room B. This is because the center liquid CL is in the mixed state of a mist and the liquid. That is, when the rotating shaft 2 rotates around the shaft center O, the center liquid CL, which is sealed in the center room B by the amount unfilled with the capacity, is dragged by the outer circumferential surface of the shaft sleeve 21, the rotating ring 41 and the collar 42 of the secondary mechanical seal 4. Accordingly the center liquid CL circulates in the direction similar to the rotation of the rotating shaft 2, while it is stirred by collision with the baffle plate 5, and scattered to generate the mist.

Therefore, as not in the past, the sealed slide surface 4S of the secondary mechanical seal 4 does not fall into the non-lubricating slide state due to generation of the gas zone. The center liquid CL, which is filled in the center room B in the mixing state of the mist and liquid, comes to the outer circumference of the sealed slide surface 4S of the secondary mechanical seal 4. This shows a good lubricating function. Thereby slide heat at the sealed slide surface 4S can be effectively lowered, even if enforcing circulation of the center liquid CL is not carried out by the pumping ring as in the past.

Further, since the leaked gas does not gather to the side of the inner circumference, it is effectively discharged from the first gas vent line GV1 that is opened at the upper end position of the center room B. Further, heat generation in the center liquid CL by stirring becomes small in comparison with the case of filling the center liquid CL with the center room B.

In addition, the center room B is separated roughly in the axial direction by the ringed dividing plate 6 that is positioned between the primary mechanical seal 3 and the secondary mechanical seal 4. Therefore, the leaked gas, which is vaporized from the sealed liquid SL leaked from the primary mechanical seal 3, cannot easily enter the vicinity of the secondary mechanical seal 4. Therefore, most of the leaked gas is guided to the second gas vent line GV2 that opens near the primary mechanical seal 3 relative to the dividing plate 6. And it flows back to the collect part for the leaked gas, which is not shown in the figure. Therefore, this constitution is quite effective in case large leakage from the primary mechanical seal 3 is likely to occur with the high pressure of the sealed liquid SL.

If the sealed liquid SL leaks from the primary mechanical seal 3, thermal energy is consumed as the heat of vaporization when vaporizing the sealed liquid SL. Therefore, cooling effect of the center liquid CL is expected. If excessive rise in temperature is expected depending on the condition used, the cooling water from outside are passed to the jacket C via the holes $CW_{IN}/CW_{OUT}$. Here the jacket C is formed on the inner circumferential part of the seal cover 14 of the housing 1. Thereby the center liquid CL can be cooled via the inner circumferential wall of the seal cover 14. Thus, slide heat of the sealed slide surface 4S of the secondary mechanical seal 4 is effectively eliminated. In addition, vaporization by heat of the center liquid CL can be suppressed.

Setting jigs 7 shown as double dotted line in FIG. 1 are used when constructing the tandem seal. The setting jigs 7 are attachable plurally to the end part of the seal cover 14 of the housing 1 to the outside of the machine via bolts 71. Its inner circumferential part is engaged in the axial direction with an engaging protrusion 22a. The engaging protrusion 22a is formed on the outer circumferential surface of the sleeve collar 22.

That is, when the tandem seal is constructed, the inner circumferential part of the setting jigs 7 are engaged with the engaging protrusion 22a of the sleeve collar 22, and fixed to the housing 1 by the bolts 71. Thereby, the relative position in the axial direction of the shaft sleeve 21 to the housing 1 is determined via the setting jigs 7 and the sleeve collar 22.

The rotating ring 31 of the primary mechanical seal 3 is fixed to the flange part 21b of the shaft sleeve 21. The rotating ring 41 of the secondary mechanical seal 4 is fixed to the step part 21d of the shaft sleeve 21 via the collar 42. Accordingly, the relative position in the axial direction of the shaft sleeve 21 to the housing 1 is determined by the setting jigs 7, which further determines the attachment position in the axial direction of the rotating rings 31, 41. Therefore, the coil springs 37, 48 are pressed to a certain length in the axial direction. Here the coil springs are at the rear side of the fixed rings 33, 46 of both mechanical seals 3, 4 that are held to the side of the housing 1. Thereby a certain load for close contact is given to the sealed slide surfaces 3S, 4S of both mechanical seals 3, 4.

Further, the setting jigs 7 are removed after the tandem seal is constructed in the state shown in FIG. 1.

Concerning about the tandem seal according to the embodiment described above, a slide test is conducted by an actual machine. The results are explained below. In addition, the rotating rings 31, 41 of respective mechanical seals 3, 4 were made of SiC. The fixed rings 33, 46 were made of carbon or a complex material containing carbon as a base material. The diameter size of the sealed slide surfaces 3S, 4S was set about 110 mm. Further, other test conditions were set as follows.

1. Sealed liquid SL
   Kind of liquid; liquefied propane gas
   Temperature; 30° C.
   Pressure; 1.7 MPaG
2. Center liquid CL
   Kind of liquid; refrigerating machine oil
   Amount of liquid; the level of the shaft center
3. Cooling by the jacket C; 5.0 L/min. (water)
4. Rotating speed; 3600 $min^{-1}$
5. Test time; 100 hrs In this test, leakage operation was carried out to intentionally leak the sealed liquefied propane gas from the primary mechanical seal 3 to the center room B at regular intervals. Liquid temperature of the center liquid CL (atmospheric temperature of the liquid-mist mixture) stably changed within 60~65° C. Gas leakage was not observed from the secondary mechanical seal 4 to the atmosphere. Further, the sealed slide surface was a good condition after the test was finished. The amount of the wear was small of a few $\mu$m.

That is, even if the amount of the center liquid CL sealed to the center room B is set the oil level substantially to the level of the shaft center 0, a good lubricating and cooling state can be kept to the sealed slide surface 4S of the secondary mechanical seal 4. Further, it was confirmed that appropriate selection of combination between materials of the rotating ring and the fixed ring and appropriate cooling of the center room B by sending water to the jacket C leads to an excellent function.

In addition, this invention is not limited to the embodiment shown in the figures. The dividing plate 6 and the jacket C may be provided if necessary. The mechanical seals 3, 4 can be constructed in various constitutions and forms. Moreover, in the above embodiment, although it is explained that the rotating shaft 2 extends horizontally, the rotating shaft 2 may extend in an inclined or a vertical direction.

According to the tandem seal of the invention, the center liquid having unfilled amount of the capacity is sealed in the center room. The center room is arranged between the primary mechanical seal and the secondary mechanical seal. When rotating, the center liquid is stirred and scattered to become a mist. Therefore, the vaporized sealed gas, which is leaked from the primary mechanical seal, does not form gas zone by collecting in the inner circumferential part of the center room. Thus, it can satisfactorily lubricate the sealed slide surface of the second mechanical seal. The leaked gas from the primary mechanical seal can be discharged effectively and naturally from the gas vent line facing and opening to the center room. Further, heat generation by agitating is small compared to the case when the center liquid is filled in the center room. Therefore, the pumping ring for circulating the center liquid or the cooling device is unnecessary, which causes miniaturization and cost saving. Further, because pumping rings are unnecessary, it prevents decreasing pumping efficiency of the pumping ring by mixing the bubble into the center liquid. Further, it prevents generation of vibration by cavitation phenomena.

According to the tandem seal of the invention, the baffle plate is provided on the housing in the shaft sealing part, which intersects the circumferential direction of the center room. Therefore, the center liquid collides with the baffle plate when it revolves and flows by contact with the elements at the rotating side. This leads to effective stirring and successful scattering to form the mist, and prevents formation of gas zone in the inside of the center room. It further results high lubricating effect relative to the sealed slide surface of the secondary mechanical seal.

According to the tandem seal of the invention, the dividing plate is provided for roughly separating the center room in the axial direction. Therefore, the vaporized sealed gas leaked from the primary mechanical seal is hard to enter near the secondary mechanical seal. Therefore, influence of the leaked gas on the secondary mechanical seal can be suppressed more effectively.

According to the tandem seal of the invention, the coolant jacket is provided on the housing in the shaft sealing part for flowing the coolant from outside. Therefore, the center liquid can be cooled forcibly. Therefore, the sealed slide surface of the secondary mechanical seal can get a high cooling effect.

What is claimed is:

1. A tandem seal comprising:

a housing;

a rotating shaft provided in the housing;

a primary mechanical seal and a secondary mechanical seal arranged in a tandem manner in an axial direction along the rotating shaft in a space between the rotating shaft and the housing, wherein a center liquid is sealed in a center room among the housing and the primary and secondary mechanical seals, wherein the center liquid has an amount enough to be stirred or agitated by a rotating part of the secondary mechanical seal, wherein a liquid surface level in a stationary state of the center liquid is set substantially to a shaft center of the rotating shaft, and wherein a baffle plate is fixed to the housing above the liquid surface level in the stationary state of the center liquid in such a way that the center liquid collides with the baffle plate when the rotating shaft rotates relative to the baffle plate, so as to lead to effective stirring and successful scattering to form a mist.

* * * * *